Figure 1:
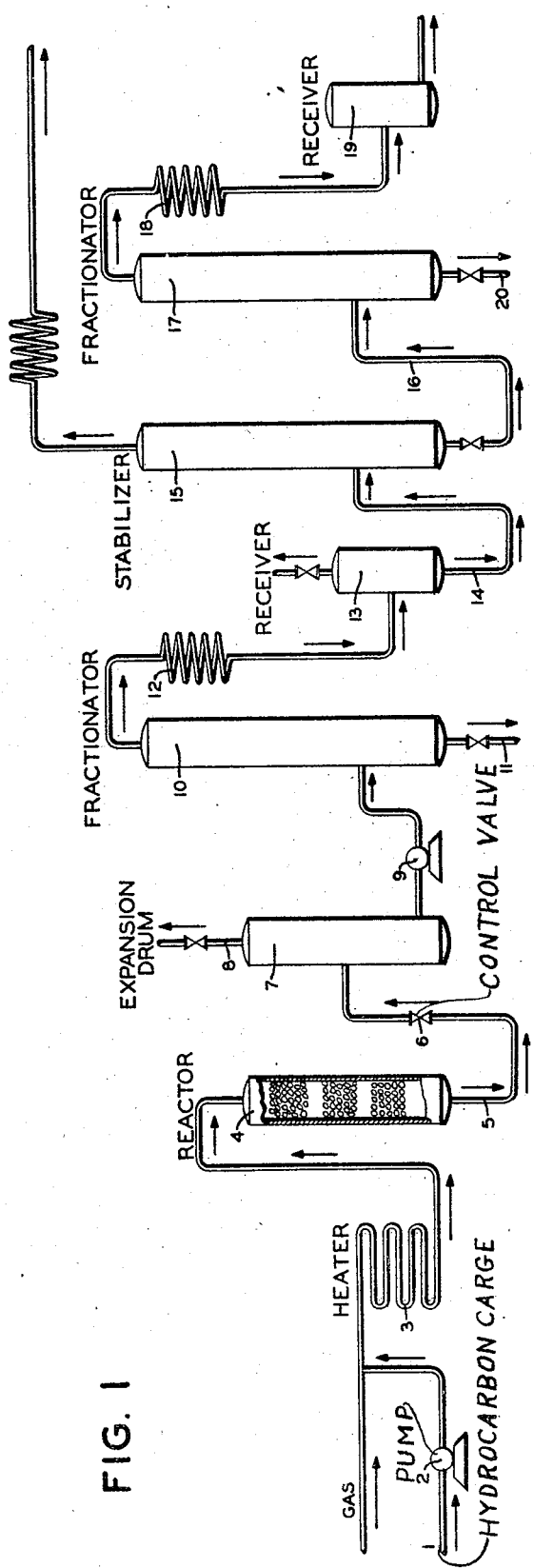

Jan. 5, 1943. P. L. VELTMAN 2,307,434
CATALYTIC TREATMENT OF HYDROCARBONS
Filed Feb. 7, 1940

PRESTON L. VELTMAN
INVENTOR
BY R. J. Dearborn
Daniel Stryker
HIS ATTORNEYS

Patented Jan. 5, 1943

2,307,434

UNITED STATES PATENT OFFICE

2,307,434

CATALYTIC TREATMENT OF HYDROCARBONS

Preston L. Veltman, Fishkill, N. Y., assignor, by mesne assignments, to The Texas Company, New York, N. Y., a corporation of Delaware Application February 7, 1940, Serial No. 317,627

4 Claims. (Cl. 196—52)

This invention relates to the catalytic treatment of hydrocarbons and particularly to the conversion of petroleum hydrocarbons by contact with solid porous type conversion catalysts in a highly divided state.

In acordance with this invention the hydrocarbon to be treated is subjected to contact with the catalyst in a reaction vessel wherein the pressure exerted upon the contact mass is subjected to controlled fluctuation at predetermined intervals of time.

The invention contemplates a continuous process of catalytic treatment wherein the hydrocarbon feed is passed continuously through a contact mass. A substantial pressure is maintained within the mass and temperatures are maintained such that the desired reaction is effected. At relatively short intervals of time the pressure is suddenly reduced without cessation in the flow of hydrocarbon feed to the mass. The reduction in pressure advantageously amounts to only a portion of the total pressure imposed upon the catalytic mass, but is sufficient to cause substantial expansion of the gaseous materials within the catalytic mass so that the active surfaces of the catalyst particles are subjected to a periodic scouring action.

The invention has particular application, for example, to the catalytic cracking of hydrocarbons by contact with a porous type of catalyst in the form of particles, pellets, or pills, etc. In such treatment a mean fluid pressure within the range from 0 to 100 pounds per square inch gauge is usually maintained within the catalytic mass. In accordance with this invention the pressure is alternately increased and decreased from the mean during the on-stream period. For example, the pressure is made to fluctuate over a range of around 10–15 pounds.

While the pressure is increasing the reactants, including gaseous materials present, are forced deeply into the pores of the catalyst particles and into the spaces between particles within the contact mass. Upon decrease in the pressure the gaseous materials escape rapidly from the pores and voids, thereby subjecting the surfaces of the catalyst to a sweeping or scouring action. This sweeping action displaces heavy liquid material tending to accumulate on the exposed surfaces of the catalyst and which liquid, if not removed, is ultimately converted into nonvolatile material forming a carbonaceous deposit upon the catalyst surfaces.

It is contemplated also that during increase in the pressure some condensation of lighter hydrocarbons present occurs and upon reduction in pressure these condensed hydrocarbons flash into vapor, thus augmenting the expansion and movement of gases within the pores of the individual catalyst particles, as well as within the void spaces between particles within the catalyst mass.

An object, therefore, of the invention is to effect forced movement of gases within the individual particles and within the catalyst mass so as to maintain the active surface areas of the catalyst more available to the reacting hydrocarbons and thus prolong the active life of the catalyst. A further object is to reduce the amount of carbonaceous material deposited upon the catalyst and thus reduce the frequency of regeneration or reactivation.

Reference will now be made to the figures of the accompanying drawing in order to describe the invention more fully. Figure 1 comprises a flow diagram illustrating the application of the process of this invention to the catalytic cracking of hydrocarbons, while Figure 2 comprises a diagrammatic illustration of the pressure control valve mechanism.

Referring to Figure 1, the feed which may be any material to be converted, such as hydrocarbon gases, vapors, or liquids, is drawn through a pipe 1 by a centrifugal charge pump 2 and delivered to a heater 3. In the heater the feed is heated to a suitable temperature which, for example, may be around 950° F. or in the range of around 800° to 1000° F.

The heated feed is conducted from the heater 3 to a reaction chamber 4 containing the catalyst. The catalyst may be any suitable catalyst for the reaction involved, such as silicates of alumina and/or oxides of metals. The catalyst may comprise activated hydrosilicate of alumina with or without other active materials, such as finely divided metals or metallic oxides. The catalyst is advantageously in highly divided form, as for example, in the form of particles, pills, pellets, etc.

The feed hydrocarbons may enter the top of the catalyst chamber and pass downwardly through the contact mass contained within the chamber.

The contacted hydrocarbons then pass from the bottom of the reactor through a pipe 5 containing a control valve 6 by means of which latter the pressure is controlled within the reactor 4. The control valve mechanism will be referred to later in connection with Figure 2.

The contacted hydrocarbons are discharged into an expansion drum 7 which is of sufficient size to dampen the fluctuations in pressure occasioned by the operation of the control valve 6. Gases which may tend to accumulate in the upper portion of the expansion drum 7 can be bled off from time to time or continuously through a valved pipe 8 and disposed of in any desirable way.

The liquefied hydrocarbons accumulating in the expansion drum 7 are drawn off by the pump 10 and conducted to a fractionator 10 wherein the high boiling constituents, such as gas oil, are removed and drawn off through a valved pipe 11. The withdrawn material may be recycled to the heater 3 or disposed of in any other suitable manner.

The remaining vapor fraction comprising hydrocarbons suitable for the production of motor fuel is drawn off from the top of the fractionator 10 through a condenser 12 to a receiving drum 13.

Fixed gases may be drawn off from the top of the receiving drum 13 while the liquid condensate is drawn off through a pipe 14 to a stabilizer 15.

In the stabilizer 15 the more volatile constituents, such as propane and some butane, are removed as a vapor fraction, while the stabilized liquid fraction is drawn off through a pipe 16 to a final fractionator 17.

In the fractionator 17 the stabilized hydrocarbons within the desired boiling range are removed as a vapor fraction through a cooler 18 and accumulated in a receiver 19.

Liquid constituents boiling above the end boiling point of the desired product are removed as a liquid fraction from the bottom of the fractionator through a valved pipe 20, either for recycling or discharge from the system.

Figure 2:
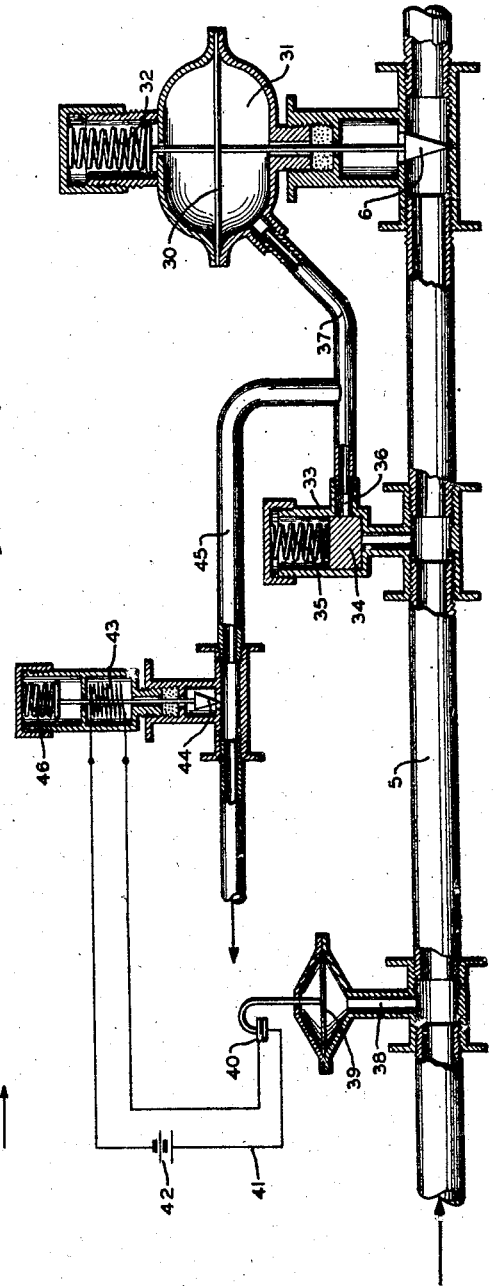

Figure 2 illustrates diagrammatically one possible way in which the pressure control valve 6 may be operated. As indicated, the control valve 6 is advantageously of the gate-valve type actuated by means of a diaphragm 30 enclosed within a chamber 31.

A spring 32, the tension of which may be adjusted, is provided to exert a positive pressure upon the diaphragm 30 sufficient to maintain the valve 6 normally in the closed position.

A pressure responsive by-pass valve 33 is connected to the pipe 5 between the control valve 6 and the outlet from the reactor 4. This valve contains a piston 34 actuated by a spring 35 and also is responsive to the pressure within the pipe 5. The valve 33 vents through a port 36 into a pipe 37 communicating with the lower chamber 31 of the control valve 6.

Also connected with the pipe 5 between the by-pass valve 33 and the outlet of the reactor 4 is a pressure responsive contact device 38. The device 38 contains an enclosed diaphragm 39 which is responsive to the pressure prevailing within the pipe 5.

The diaphragm 39 is adapted to make and break the contact points 40 in an electrical circuit 41. The electrical circuit 41 includes a source of electricity such as a battery 42 and the winding of a solenoid 43.

The function of the solenoid 43 is to open a relief valve 44 in a pipe 45 communicating with the pipe 37 previously mentioned. The valve 44 is provided with a spring 46 adapted to close the valve 44 when the electrical circuit 41 is open.

In actual operation when the control valve 6 is at first in the closed position the relief valve 44 will be in the open position. With the valves in these positions, pressure begins to increase within the pipe 5 and causes the diaphragm 39 in the device 38 to rise, thereby opening the contact points 40 and breaking the circuit 41. As soon as the circuit 41 is broken, the spring 46 closes the relief valve 44.

Upon further increase in the pressure within the pipe 5 the piston 34 in the by-pass valve 33 is forced upwardly against the tension of the spring 35 until the port 36 is opened allowing the by-pass valve to vent through the pipe 37 into the chamber 31. As the pressure increases within the chamber 31 the diaphragm 30 is raised, causing the valve 6 to open.

When the valve 6 opens the pressure within the pipe 5 drops rapidly so that the spring 35 pushes the piston 34 downwardly, thus closing the port 36. When the port 36 is thus closed gas or other fluid is trapped within the pipe 37 and the chamber 31 so that the valve 6 is maintained open. With further drop in pressure within the pipe 5 the diaphragm 39 in the device 38 falls, closing the contact points 40 and thereby closing the electrical circuit 41. When this circuit is closed the solenoid 43 opens the valve 44 permitting the fluid trapped within the pipe 37 and chamber 31 to discharge through pipe 45 to the atmosphere or other zone of reduced pressure. Upon release of the pressure from the chamber 31 the valve 6 is closed by the spring 32, thus completing the cycle of operations.

In operating the process it is contemplated that the valve 6 will open suddenly and at relatively short intervals of time. The interval may be about 30 seconds or in the range from several seconds to several minutes, although it may be further increased or decreased, as desired.

The opening and closing of the valve 6 should be adjusted so as to cause a relatively small drop in pressure, as for example, around 10 to 15 pounds, although this may be varied, depending upon conditions encountered with particular stocks.

By way of example, a mean pressure of around 50 pounds per square inch gauge may be maintained in the reactor 4, while the valve 6 is operated so as to cause the pressure within the reactor to fluctuate at intervals over a range of about 10 to 15 pounds per square inch gauge.

In this way a pressure wave effect is imposed throughout the contact mass and upon the individual particles within the mass, causing a substantial change in the mass-volume relationship of the hydrocarbons within the catalyst mass, thereby giving rise to the desired periodic sweeping or scouring action already described.

As previously mentioned, the charge pump 2 is advantageously of the centrifugal type adapted to operate against a fluctuating discharge pressure.

While reference has been made above to the utilization of gaseous products of reaction present within the reactor 4 for effecting the scouring and sweeping action, it is contemplated that gases from an extraneous source may be used to increase the flushing effect; for example, a gaseous material such as nitrogen, hydrogen, methane, etc., may be introduced to the system along with the hydrocarbon feed. Such added gas may be introduced to the inlet of the heater 3, as indicated, or may be separately preheated and introduced with the heated hydrocarbon feed directly to the top of the reactor 4.

Obviously many modifications and variations of the invention as hereinbefore set forth may be made without departing from the spirit and scope thereof and therefore only such limitations should be imposed as are indicated in the appended claims.

I claim:

1. In the catalytic conversion of hydrocarbons, the method comprising continuously introducing a stream of feed hydrocarbon in vapor phase to a reaction zone containing a mass of solid conversion catalyst in particle form maintained under conversion conditions, passing the heated feed hydrocarbon vapors through said mass within the reaction zone, maintaining an absolute pressure prevailing in the catalyst zone within a relatively narrow range extending both below and above a predetermined mean pressure, subjecting the pressure in the reaction zone to substantially continuous fluctuation within said range, without interrupting the introduction of hydrocarbon feed thereto, the pressure alternately increasing and decreasing from said mean at intervals of from several seconds to several minutes, and discharging hydrocarbon products of conversion from the reaction zone.

2. The method according to claim 1 in which the pressure increases and decreases over a range of about 10 to 15 pounds.

3. In the catalytic cracking of hydrocarbon oil to produce gasoline, the method comprising continuously introducing a stream of vaporized feed oil in the temperature range of 800 to 1000° F. to a reaction zone containing a mass of solid conversion catalyst in particle form maintained under cracking conditions, passing the heated feed oil vapors through said mass within the reaction zone, maintaining an absolute pressure prevailing in the catalyst zone within a relatively narrow range extending both below and above a predetermined mean pressure, subjecting the pressure in the reaction zone to substantially continuous fluctuation within said range, without interrupting the introduction of hydrocarbon feed thereto, the pressure alternately increasing and decreasing over a range of about 10 to 15 pounds, and discharging hydrocarbon products of conversion from the reaction zone.

4. The method according to claim 3 in which the pressure alternately increases and decreases at intervals of about several seconds to several minutes.

PRESTON L. VELTMAN.